(12) United States Patent
Kayser

(10) Patent No.: US 8,004,216 B2
(45) Date of Patent: Aug. 23, 2011

(54) VARIABLE INTENSITY LED ILLUMINATION SYSTEM

(75) Inventor: David J. Kayser, Saint Inigoes, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 301 days.

(21) Appl. No.: 12/114,063

(22) Filed: May 2, 2008

(65) Prior Publication Data

US 2009/0273300 A1 Nov. 5, 2009

(51) Int. Cl.
*H05B 37/02* (2006.01)
(52) U.S. Cl. ......... 315/312; 315/291; 315/363; 362/800
(58) Field of Classification Search .................. 315/312, 315/313, 185 S, 185 R, 123, 125, 122, 75, 315/192, 291, 363, 56; 362/800, 611–613, 362/448, 545
See application file for complete search history.

(56) References Cited

U.S. PATENT DOCUMENTS

| | | | | |
|---|---|---|---|---|
| 4,307,606 A * | 12/1981 | Johnson | ........................ | 73/295 |
| 5,598,068 A * | 1/1997 | Shirai | ...................... | 315/185 R |
| 5,929,568 A * | 7/1999 | Eggers | .......................... | 315/56 |
| 6,161,910 A * | 12/2000 | Reisenauer et al. | .......... | 315/309 |
| 6,371,637 B1 * | 4/2002 | Atchinson et al. | ............ | 362/555 |
| 6,600,274 B1 | 7/2003 | Hughes | | |
| 7,157,859 B2 | 1/2007 | Inoue | | |
| 7,213,941 B2 * | 5/2007 | Sloan et al. | ................... | 362/246 |
| 7,317,287 B2 * | 1/2008 | Blumel | ........................ | 315/291 |
| 7,453,218 B2 * | 11/2008 | Guthrie | ........................ | 315/312 |
| 7,605,807 B2 * | 10/2009 | Chen et al. | ...................... | 345/77 |
| 2007/0258176 A1 * | 11/2007 | Ball et al. | ........................ | 361/56 |

* cited by examiner

*Primary Examiner* — Jacob Y Choi
*Assistant Examiner* — Ephrem Alemu
(74) *Attorney, Agent, or Firm* — Mark D. Kelly; Mark O. Glut

(57) ABSTRACT

A variable intensity LED illumination system is configured to provide a change in luminance versus input voltage that corresponds to a desired transfer function, such as the dimming characteristics of an incandescent lamp, which more closely resembles the response of the human eye. The system also advantageously provides overvoltage protection, increased brightness, energy efficiency, and significantly better longevity and ruggedness, compared to incandescent lamps.

9 Claims, 5 Drawing Sheets

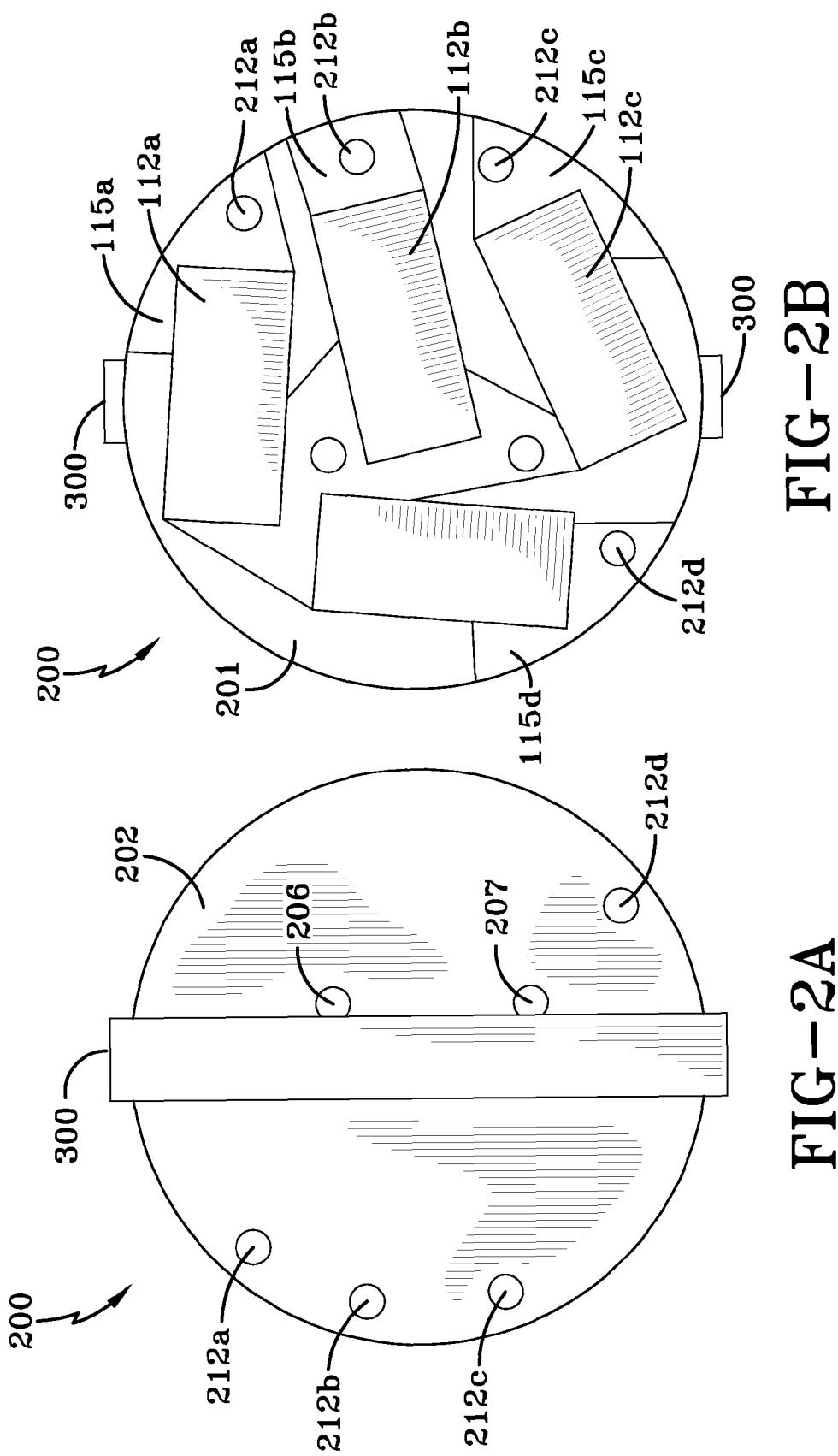

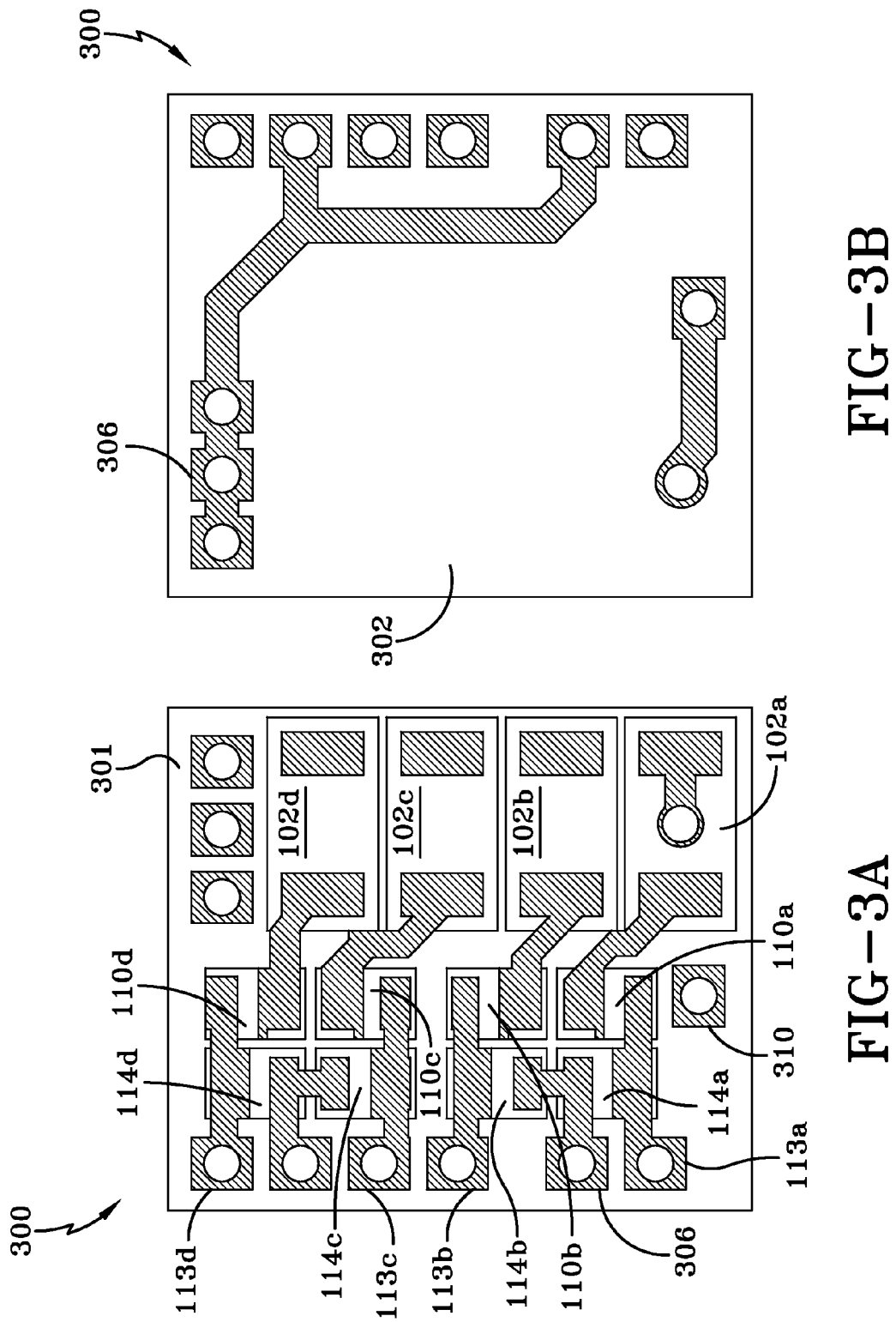

VARIABLE INTENSITY LED ILLUMINATION SYSTEM

GOVERNMENT INTEREST

The invention described herein may be manufactured, licensed, and used by or for the U.S. Government.

TECHNICAL FIELD

The present invention relates generally to variable intensity light sources and more particularly to a light emitting diode illumination system that can be configured to predetermined luminescence vs. supply voltage characteristics.

BACKGROUND

LED light sources are rapidly replacing incandescent and fluorescent light sources in many applications. The term light emitting diode (LED) is used to refer to a semiconducting material impregnated, or doped, with impurities to create a p-n junction capable of emitting light, and includes both a laser diode and a spontaneously emitting LED. LED light sources are much more efficient, are more rugged and have longer life cycles, produce little heat, are generally smaller, and are lighter in weight than their incandescent counterparts.

Despite their many advantages, conventional LED light sources have some limitations. In particular, LEDs are not well suited to applications that require variable intensity. Conventional incandescent bulbs work well in such applications because their luminous intensity varies exponentially in response to a linear change in voltage, closely matching the response of the human visual system. Changes in luminance of four orders of magnitude can be achieved with incandescent light sources. LEDs, however, essentially provide a linear change in intensity in proportion to a change in current and variability over only two orders of magnitude is typically achieved. The luminous intensity of a conventional LED thus appears to the eye to change slowly at higher light levels and abruptly at lower levels of luminance when an LED light source is placed in a conventional dimming circuit. Embodiments according to the present invention are directed to solving these problems by providing an LED light source that may be configured to vary in intensity according to a predetermined voltage-to-luminance transfer function, to provide dimming characteristics that are closer to the response of the human eye, and over the full four orders of luminance change.

SUMMARY

In general, in one aspect, an embodiment of a variable intensity LED light system according to the present invention includes a number of circuit legs coupled in parallel. Each of the circuit legs includes a current limiting device in series with a first circuit element that provides a distinct voltage set point for that circuit leg, and a second circuit element that provides a regulated voltage. An LED is coupled in parallel with the second circuit element of each circuit leg. In general, the regulated voltage of the second circuit element is greater than the forward voltage drop of the LED. The distinct voltage set points of the first circuit elements and the resistances of the current limiting devices are calibrated to correspond to points on a target luminance-versus-voltage curve. The target luminance-versus-voltage curve may approximate luminance-versus-voltage curve for an incandescent lamp. In another aspect, an embodiment of a variable intensity LED light system according to the present invention includes an additional circuit leg coupled in parallel with the plurality of circuit legs, in which the additional circuit leg has a resistor in series with a Zener diode that provides a regulated voltage, and an LED coupled in parallel with the Zener diode This additional circuit leg is provided for low luminance operation.

In general, in another aspect, an embodiment of a method for varying the intensity of an LED lighting system in response to a change in supply voltage includes providing a plurality of circuit legs each having a first node for coupling to a positive terminal of a variable voltage DC source, a second node for coupling to the anode of an LED and a third node for coupling to the cathode of the LED and to a negative terminal of the variable voltage DC source. The method further includes providing a current limiting device in each circuit leg having a resistance to limit the current delivered to the LED to a predetermined value; providing a first circuit element in each circuit leg which, at a given supply voltage, changes from a high impedance to a low impedance when a voltage set point has been exceeded at the input node; and a second circuit element in each circuit leg to regulate the voltage across the LED. In another aspect, the method for varying the intensity of an LED lighting system in response to a change in supply voltage includes providing an additional circuit leg coupled in parallel with the plurality of circuit legs, in which the additional circuit leg has a resistor in series with a Zener diode that provides a regulated voltage, and an LED coupled in parallel with the Zener diode.

BRIEF DESCRIPTION OF THE DRAWINGS

Embodiments according to the invention are illustrated in the accompanying drawings in which like reference numerals represent like parts throughout and in which:

FIG. 2A shows a bottom plan view of a printed wiring board for mounting component parts in an embodiment of a variable intensity LED illumination system according to the present invention;

FIG. 2B shows a top plan view of the printed wiring board shown in FIG. 2A;

FIG. 3A shows a top plan view of a second printed wiring board for mounting component parts in an embodiment of a variable intensity LED illumination system according to the present invention;

FIG. 3B shows a bottom plan view of the second printed wiring board shown in FIG. 3A;

DETAILED DESCRIPTION

In the following detailed description, reference is made to the accompanying drawings which are a part of this patent disclosure, and in which are shown by way of illustration specific embodiments in which the invention, as claimed, may be practiced. This invention may, however, be embodied in many different forms and should not be construed as limited to the embodiments set forth; rather, these embodiments are provided so that this disclosure will be thorough and complete, and will fully convey the scope of the invention to those skilled in the art.

Figure 1A:
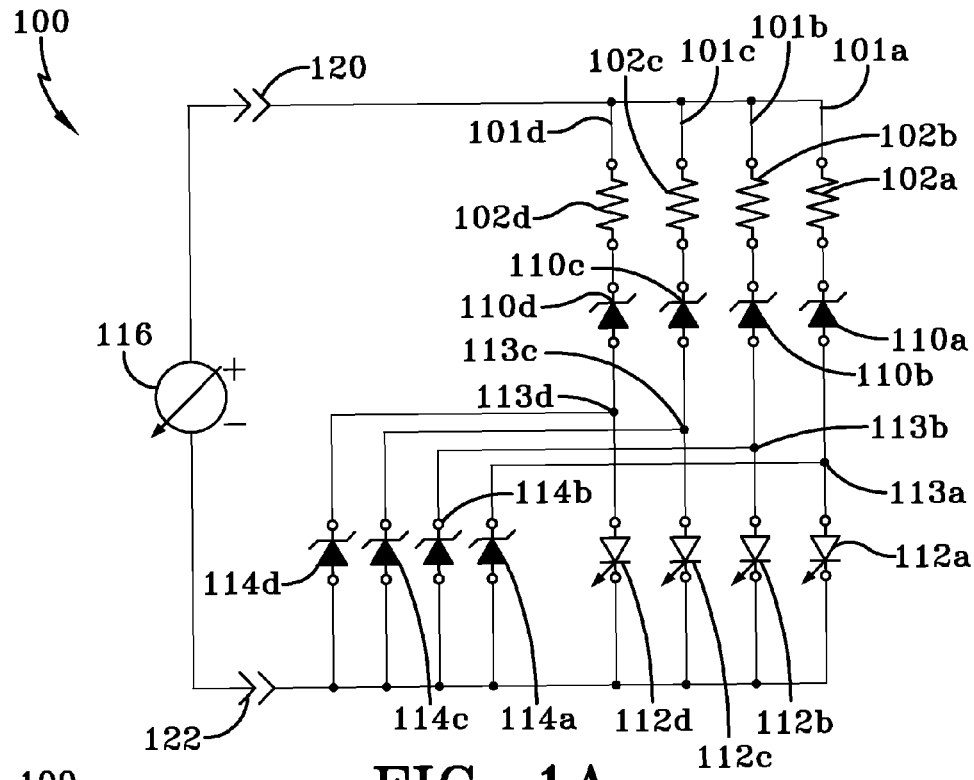
FIG. 1A shows a circuit diagram of an embodiment of a variable intensity LED illumination system according to the present invention.

FIG. 1A shows a schematic diagram of an embodiment of a variable intensity LED illumination system 100 according to the present invention. LED illumination system 100 is designed for small, low voltage DC, variable intensity lighting applications, such as the illumination of a vehicle instrument panel or dashboard, or for providing internal lighting for avionics, flight instruments, indicators, and the like. LED illumination system 100 includes a positive input node 120 and a ground node 122 for connection to a variable voltage direct current source 116. In this embodiment LED illumination system 100 is designed to be powered by a 5-28 Volt DC variable voltage source such as the low voltage power supply for avionics and instrumentation commonly found on commercial and military aircraft. In alternative embodiments, the invention may be adapted for use with higher or lower variable voltage sources.

LED illumination system 100 includes four LED circuit legs 101a-d coupled to second Zener diodes 114a-d which function as fixed voltage sources for LEDs coupled to each circuit leg. Each LED circuit leg 101a-d includes a resistor 102a-d coupled to positive input node 120 which act as current limiting devices.

Resistors 102a-d are each in series with first Zener diodes 110a-d which, in turn, are in series with second Zener diodes 114a-d coupled to ground node 122. First Zener diodes 110a-d and second Zener diodes 114a-d are oriented to operate in conventional reverse breakdown mode.

LEDs 112a-d are coupled in parallel with corresponding second Zener diodes 114a-d of each circuit leg at coupling nodes 113a, 113b 113c and 113d, respectively. Second Zener diodes 114a-d are selected to have Zener voltages sufficient to ensure voltages across LEDs 112a-d are in excess of the LEDs' forward voltage drops. For example, in LED illumination system 100, a Zener voltage of about 5.1 volts has been selected for Zener diodes 114a-d since LEDs 112a-d have turn-on voltages of between 3.5V to 4.1V. Second Zener diodes 114a-d also provide over-voltage/spike protection for LEDs 112a-d by safely shunting away any transients that might otherwise damage the LEDs.

Figure 1B:
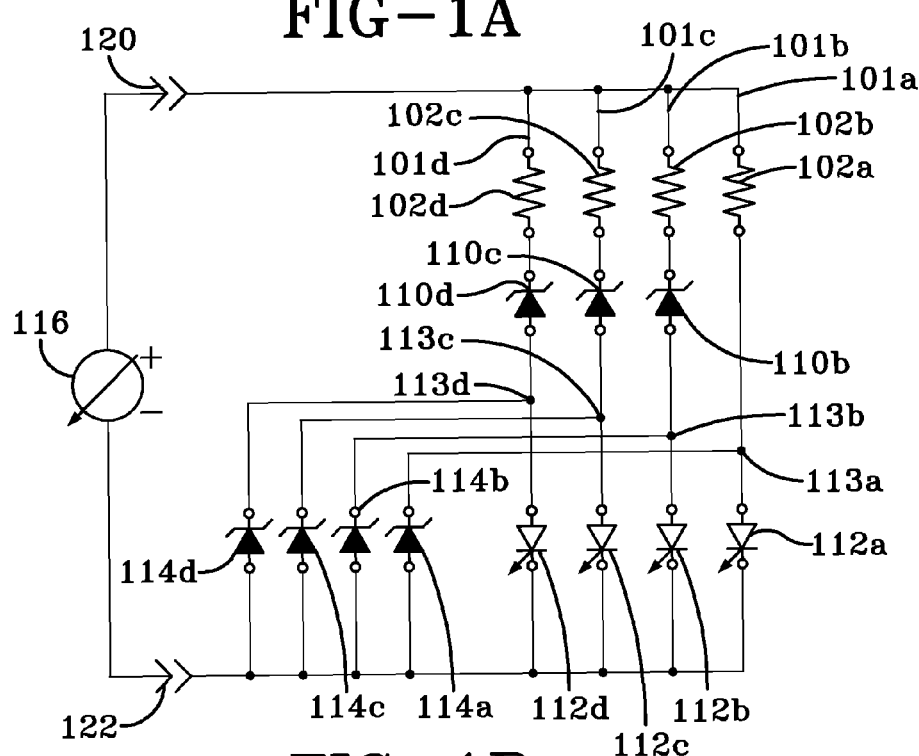
FIG. 1B shows a circuit diagram of an alternative embodiment of a variable intensity LED illumination system according to the present invention.

FIG. 1B shows an embodiment of an LED illumination system 100 where first Zener diode 110a has been eliminated to provide for very low luminance operation.

Since, as noted above, the luminance of an LED is proportional to current, a luminance/voltage characteristic of an LED illumination system according to the present invention may be approximated by taking the current through each of the LEDs at a given supply voltage and using the luminance versus current curve from the LED manufacturer to establish individual LED luminance outputs. The luminance of an LED illumination system 100 may then be determined by summing the luminance of each of the LED circuit legs. Current supplied to LEDs 112a-d in circuit legs 101a-d is controlled by the value of current limiting resistors 102a-d. Current limiting resistors 102a-d are selected so that the sum of the currents through each LED 112a-d will deliver a combined luminance from the LEDs 112a-d corresponding to target luminances at voltage set points.

Figure 5:
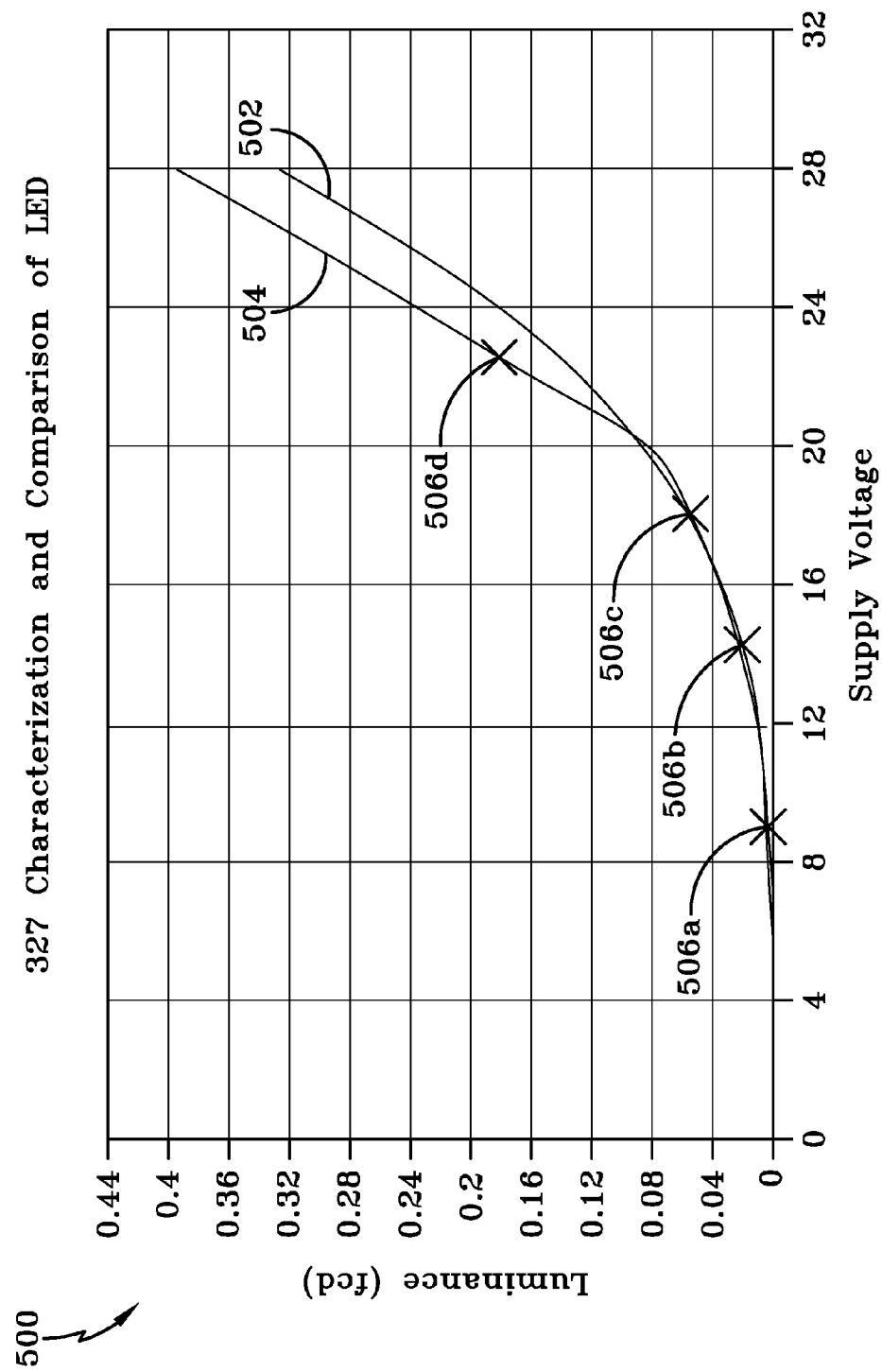
FIG. 5 shows a graph of luminance versus voltage for an embodiment of a variable intensity LED illumination system according to the present invention.

LED illumination system 100 is designed to approximate a luminance-versus-supply voltage profile for a small low voltage incandescent lamp. In this example, as shown on graph 500 of FIG. 5, four set points 506a-d were selected to model the luminance versus-supply voltage profile for a typical incandescent Miniature Lamp ML-327/#327. The No. 327 lamp, or "peanut bulb," is used in many aircraft instrumentation lighting applications. A Curve 502 on graph 500 shows a luminance versus-supply voltage profile averaged from a sample of six No. 327 lamps. A curve 504 represents the actual luminance versus supply voltage characteristics measured for a prototype variable intensity LED illumination system 100 according to the present invention. As can be seen from curve 504, the prototype provides higher luminescence in the higher voltage range compared to the incandescent lamp. This represents a design improvement for any application where sunlight backlighting provides difficulty in seeing instrument indicators.

Some adjustment of resistor values may be required after the luminance from LED illumination system 100 is measured to compensate for performance characteristics of components. Accordingly, the actual luminance curve for a particular implementation should be verified experimentally to allow for any changes that may result from variations in component specifications.

The voltage set points for circuit legs 101a-d are determined by summing the Zener voltage of first Zener diodes 110a-d with the Zener voltage of second Zener diodes 114a-d in their respective circuit legs 101a-d. Voltage set points for the prototype of LED illumination system 100 are as follows: LED circuit leg 101a, 10.7 volts, LED circuit leg 101b, 15.1V, LED circuit leg 101c, 18.1V, and LED circuit leg 101d, 23.1V.

The use of four set points and four LEDs provides a good approximation of the voltage versus luminous intensity characteristics of the No. 327 lamp. In alternative embodiments more or fewer set points, circuit legs and LEDs may be employed, depending on the requirements of a particular application. Other luminance profiles may similarly be modeled in alternative embodiments.

In many lighting applications a white or yellow-white light is desired. Typically, white LEDs use a blue emitting chip in conjunction with a light converter such as yellow phosphor, which absorbs the blue light and emits white or yellow white light. In this embodiment, LEDs 112a-d are InGaN blue with a yellow phosphor blob coating. InGaN LEDs have high intensity and excellent reliability. The yellow phosphor coating converts the blue light emitted by the LED to a white light spectrum but also advantageously has reduced output in the infrared range.

LEDs emitting other light colors or combinations of colors may likewise be employed in alternative embodiments.

A wide variety of stock LEDs may be used in embodiments of variable intensity LED illumination systems according to the present invention depending on the requirements of a particular application. For the prototype LED illumination system 100, a Fairchild FOLF598CIWTR, commonly used in camera flash applications, was selected. The Fairchild package was chosen based on its availability, small size, packaging, performance characteristics, luminance, and price. The Fairchild FOLF598CIWTR provides an array of four InGaN LEDs mounted on a circuit board. Another LED that may be used is a discrete surface mounted LED manufactured by Dominant. The Dominant LEDs are significantly less expensive at the present time and provide comparable performance.

Figure 4:
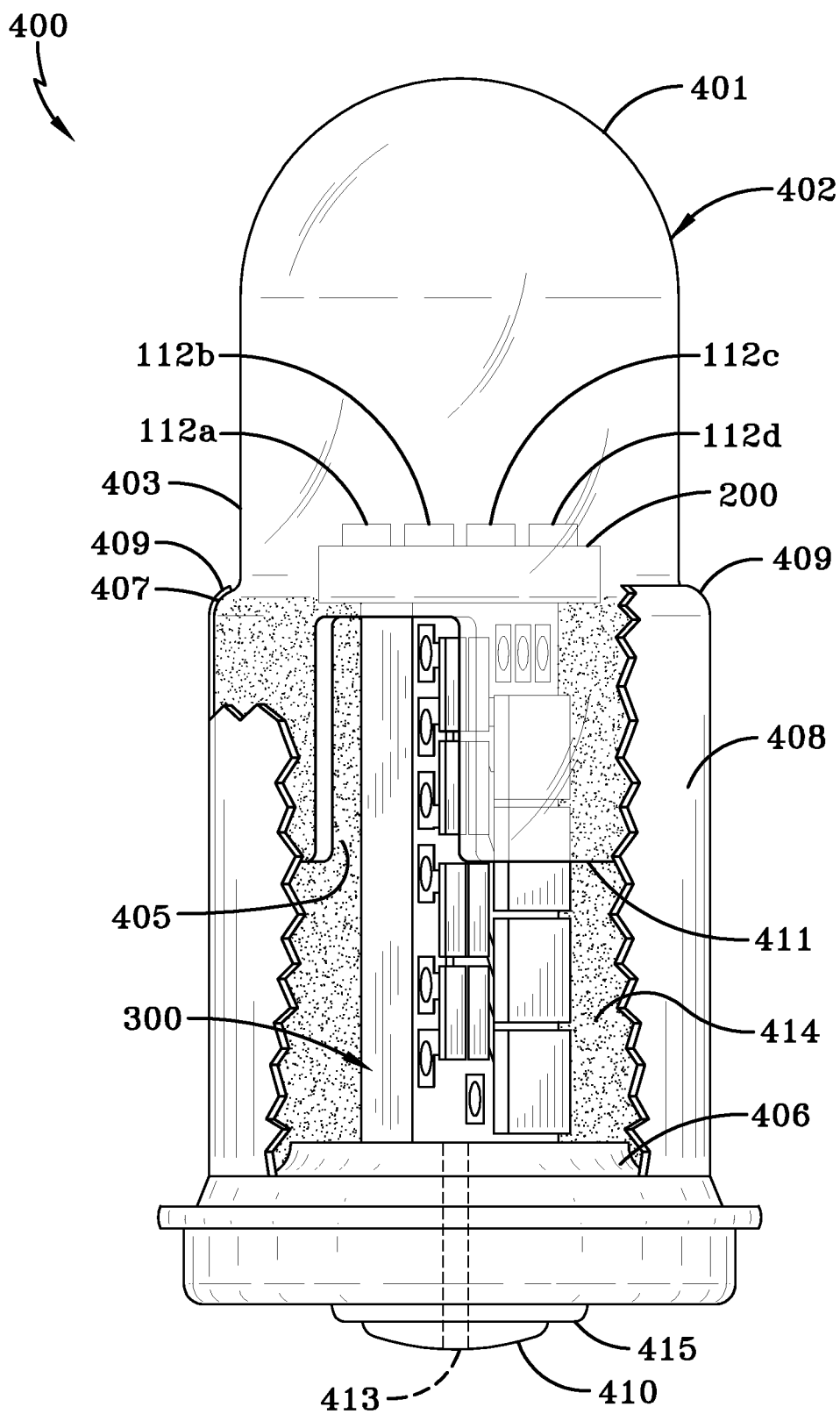
FIG. 4 shows a perspective view of an embodiment of a variable intensity LED illumination system according to the present invention that is dimensioned to correspond to a standard No. 327 instrumentation bulb.

The details of construction of a lamp 400 incorporating an LED illumination system 100 according to the present invention will now be described. Lamp 400, shown in perspective in FIG. 4, is designed as a replacement for the No. 327 instrumentation lamp.

The exterior dimensions of lamp 400 correspond to the exterior dimensions of a conventional No. 327 instrumentation light bulb in accordance with MS25237 and multiple industry supplier data. Lamp 400 includes an envelope or lens 402 of a clear polycarbonate injection molded material having a domed top portion 401 and a cylindrical sidewall 403 extending down and terminating at a lower edge 411. At approximately the midpoint of sidewall 403, a ridge 407 projects radially outwardly to a widened bottom portion of sidewall 403 and continues to lower edge 411. Ridge 407 provides a stop to engage a corresponding inwardly projecting rim 409 formed at the top of a cylindrical metal sleeve 408 that is dimensioned to slide mount over the dome 401 of lens 402 and cover the bottom portion of sidewall 403. Sleeve 408 extends a short distance down beyond edge 411 where it flares out to provide a mount for a disc shaped base 406 of a phenolic insulating material.

In a variety of aircraft applications it is desirable to reduce the infrared output of instrumentation lamps. Although the infrared output of LEDs 112a-d is already significantly lower then that of a comparable No. 327 incandescent lamp, infrared output may be further reduced by the addition of an infrared inhibitor to the clear polycarbonate material of lens 402.

Internally, lamp 400 includes two wiring boards, a disc-shaped printed wiring board (PWB) 200 for mounting LEDs (LED board 200) and a PWB 300 for mounting LED driver components of LED illumination system 100 (Driver Board 300). PWBs 200 and 300 are conventional circuit boards formed of a dielectric resinous substrate material over which a conductive layer such as copper, gold, or aluminum is applied and etched to form traces for electrically coupling components mounted thereto. Driver board 300 is mounted edgewise perpendicularly beneath PWB 200 inside of lamp 400.

FIG. 2B shows a plan view of the top surface 201 of PWB 200 on which LEDs 112a-d are positioned. Top surface 201 faces up toward domed top portion 401 of lens 402. FIG. 2A shows the bottom surface 202 of PWB 200. Bottom surface 202 includes two center contacts 206 and 207 which are coupled via through-holes to traces on top surface 201. When PWB board 300 is mounted perpendicularly beneath PWB board 200, contacts 206 and 207 are coupled via traces on PWB 300 to ground terminal pad 306 which is coupled via pigtail or the like to metal sleeve 408. Bottom surface 202 also has four circumferential contacts, 212a, 212b, 212c and 212d that are through coupled to trace areas 115a-d, respectively, directly above on top surface 201. Circumferential contacts, 212a-d are coupled to LED coupling nodes 113a-d, respectively, on PWB 300.

PWB 300 is positioned perpendicularly to PWB 200 and is mounted edgewise to the bottom of PWB 200 by soldering contacts 206 and 207 to pad 306 on PWB 300. A good electrical coupling of the two boards is all that is required to attach the boards at this stage, since a potting compound will be added during final assembly to secure and protect all of the internal components. Two radially opposing alignment slots 405 are formed in sidewall 403 of lens 402 and extend up from lower edge 411 to just above the ridge 407 (only one is shown in the perspective view of FIG. 4). Slots 405 are dimensioned to engage the outer edges of PWB 300 and are cut deep enough to ensure that the top surface 301 of PWB 300 lies at or above ridge 407 when PWB 300 is inserted.

After PWBs 200 and 300 have been joined together and inserted into slots 405, a suitable potting compound 414 such as CONAP® epoxy, or similar, is injected into the bottom area of 408 to secure the boards in position, encapsulate all components. Potting compound 414 seals out moisture, prevents corrosion, and provides vibration damping and electrical insulation. Potting compound 414 should have a low coefficient of thermal expansion.

After the potting compound has been added, base 406 is affixed to the bottom of sleeve 408. Base 406 includes an axial hole 413 that is centered over a positive power terminal 310 on PWB 300. A positive center terminal 410 is formed by soldering a contact in an eyelet 415. Center terminal 410 is electrically coupled to positive power terminal 310.

PWBs 200 and 300 are designed for surface mount components; however, in alternative embodiments leaded components may be employed as well as a number of alternative component layouts. In still other embodiments, components such as resistors may be formed directly on the substrate such as by an inking process, or the like. In yet other embodiments, some or all of the components of an LED illumination system according to the present invention may be incorporated in an integrated circuit.

Operation of an embodiment of a variable intensity LED illumination system 100 according to the present invention is substantially as follows. When supply voltage 116 is at its maximum value Zener diodes 114a-d and 110a-d are in a low impedance (reverse breakdown) state and LEDs 112a-d are in a forward biased light emitting state. Current through Zener diodes 114a-d is enough to maintain the Zener voltage of 5.1V with current divided according to the impedance of the zener diode 114a-d and the associated LEDs 112a-d that are in parallel with the zener diodes. As supply voltage 116 is reduced, the circuit legs "turn off" at the voltage set points one by one and overall luminance is correspondingly reduced.

Embodiments according to the present invention may be configured to approximate the luminance/voltage characteristics of a conventional incandescent bulb or to conform to a variety of other luminance to voltage transfer functions.

Embodiments according to the present invention also require less current, have substantially longer life cycles and better ruggedness compared to incandescent bulbs. A further advantage of embodiments of variable intensity LED illumination systems according to the present invention is the ability to provide higher intensity luminance compared to conventional incandescent lamps, resulting in better visibility of instrument dials and the like when high ambient backlight conditions exist.

CONCLUSION

Embodiments of voltage variable programmable intensity LED illumination systems according to the present invention provide significant improvements over existing variable intensity light systems and are capable of being programmed to closely match a number of different intensity response curves including the intensity response curve of the human visual system. It will be clear to one skilled in the art that the above embodiments may be altered in many ways without departing from the scope of the invention. Although embodiments described herein have been described in terms of off-the-shelf surface mount components mounted to a printed wiring board, other assembly and packaging techniques and technologies may be employed in alternative embodiments based on production quantities, cost considerations, and the like. For example, where production quantities are sufficiently large, application specific monolithic or hybrid integrated circuit designs may be employed to realize variable intensity LED illumination systems according to the present invention. In other alternative embodiments, a stand-alone driver circuit for a separable array of LEDs may be provided. Likewise, a number of different lamps of different voltage ranges, or having leads or different socketing arrangements may be produced in alternative embodiments of voltage variable programmable intensity LED light systems according to the present invention. Accordingly, the scope of the invention should be determined by the following claims and their legal equivalents.

What is claimed is:

1. A variable intensity LED light system, comprising:
a plurality of circuit legs coupled in parallel, wherein each circuit leg comprises a current limiting device in series with a first circuit element that provides a distinct voltage set point for that circuit leg, a second circuit element that provides a regulated voltage and—an LED coupled in parallel with the second circuit element;
wherein each of the first circuit elements changes from high impedance to low impedance when the distinct voltage set point has been exceeded; and
wherein the distinct set points of the current limiting device in series with the first circuit element of each circuit legs are calibrated to correspond to points on a target luminance-versus -voltage curve for an incandescent lamp.

2. The variable intensity LED light system of claim 1, further comprising an additional circuit leg coupled in parallel with the plurality of circuit legs, wherein the additional circuit leg comprises a resistor in series with a Zener diode that provides a regulated voltage, and an additional LED coupled in parallel with the Zener diode, wherein the additional circuit leg does not comprise a first circuit element that provides a distinct voltage set point in order to provide for very low luminance operation of the variable intensity LED light system.

3. The variable intensity LED light system of claim 1, wherein the regulated voltage of the second circuit element is greater than the forward voltage drop of the LED.

4. The variable intensity LED light system of claim 1, wherein the target luminance-curve varies nonlinearly in response to a linear change in voltage so as to correspond substantially to the response of the human visual system from low light to high light conditions.

5. The variable intensity LED light system of claim 1, wherein the current limiting device in series with the first circuit element of each circuit leg of the plurality of circuit legs comprises a resistor in series with a first Zener diode having a Zener voltage that defines a distinct voltage set point for the circuit leg and the second circuit element of each circuit leg of the plurality of circuit legs comprises a second Zener diode that provides a regulated voltage.

6. A variable intensity LED light system, comprising:
an envelope for housing plurality of LEDs;
a plurality of circuit legs coupled in parallel, wherein each circuit leg comprises a current limiting device in series with a first circuit element that provides a distinct voltage set point for that circuit leg, a second circuit element that provides a regulated voltage; and—an LED housed within the envelope and coupled in parallel with the second circuit element;
an additional circuit leg coupled in parallel with the plurality of circuit legs, wherein the additional circuit leg comprises a current limiting device in series with a circuit element that provides a regulated voltage, and an additional LED also housed within the envelope, the LED of the additional circuit leg coupled in parallel with an additional second circuit element;
wherein each of the first circuit elements changes from high impedance to low impedance when the distinct voltage set point has exceeded; and
wherein the distinct set points of the current limiting device in series with the first circuit element of each circuit legs are calibrated to correspond to points on a target luminance-versus -voltage curve for an incandescent lamp.

7. The variable intensity LED light is configured for use as a direct replacement part for an incandescent lamp in a linearly variable voltage dimmer circuit.

8. A method of varying the intensity of a LED lighting system in response to a change in supply voltage, comprising:
providing a plurality of LEDs;
providing a plurality of circuit legs coupled in parallel, each having a first node for coupling to a positive terminal of a variable voltage DC source, a second node for coupling to the anode of an LED, and a third node for coupling to the cathode of the LED and for coupling to the negative terminal of the variable voltage DC source;
providing a current limiting device in each circuit leg in series with the LED having a resistive value that is distinct for the circuit leg;
providing a first circuit element in each circuit leg in series with the LED to change from a high impedance to a low impedance when a distinct voltage set point for each circuit leg has been exceeded at the first node; and
providing a second circuit element in each circuit leg in parallel with the LED to regulate voltage across the LED;
further comprising providing an additional circuit leg coupled in parallel with the plurality of circuit legs, wherein the additional circuit leg comprises a current limiting device in series with a second circuit element that provides a regulated voltage, and an LED coupled in parallel with the second circuit element;
wherein the additional circuit leg does not comprise a first circuit element in series with the LED to change from a high impedance to a low impedance so as to provide for a low luminance operation of the LED lighting system; and
wherein the LED lighting system is calibrated to correspond approximately to a predetermined overall luminance intensity of an incandescent lamp.

9. The method according to claim 8 wherein the predetermined overall luminance intensity is calibrated to approximate a luminous intensity-to-voltage curve for an incandescent lamp.

* * * * *